United States Patent [19]

Berz

[11] 4,203,736
[45] May 20, 1980

[54] METHOD AND APPARATUS FOR PURIFYING A GAS OF SUSPENDED PARTICLES

[75] Inventor: Wolfgang Berz, Westmount, Canada

[73] Assignee: Gimag Aktiengesellschaft, Chur, Switzerland

[21] Appl. No.: 545

[22] Filed: Jan. 2, 1979

Related U.S. Application Data

[63] Continuation-in-part of Ser. No. 793,418, May 3, 1977, Pat. No. 4,142,873.

[30] Foreign Application Priority Data

May 6, 1976 [CH] Switzerland .................. 5706/76

[51] Int. Cl.² .................. B01D 37/00; B01D 46/30; B01D 46/42
[52] U.S. Cl. .................. 55/96; 55/98; 55/288; 55/291; 55/431; 55/463; 55/474; 55/479; 55/517
[58] Field of Search .................. 55/96, 98–99, 55/288, 291, 390, 431, 463, 466, 474, 479, 517

[56] References Cited

U.S. PATENT DOCUMENTS

| | | | |
|---|---|---|---|
| 2,338,807 | 1/1944 | Emery | 55/463 X |
| 2,684,870 | 7/1954 | Berg | 55/390 X |
| 2,932,498 | 4/1960 | Metcalfe et al. | 55/463 X |
| 4,017,278 | 4/1977 | Reese | 55/96 |
| 4,033,117 | 7/1977 | Smith | 55/96 X |
| 4,142,873 | 3/1979 | Berz | 55/12 |

FOREIGN PATENT DOCUMENTS 352081 4/1922 Fed. Rep. of Germany ............ 55/431
450581 12/1974 U.S.S.R. .................. 210/268

*Primary Examiner*—Kathleen J. Prunner
*Attorney, Agent, or Firm*—Toren, McGeady and Stanger

[57] ABSTRACT

A shell and two perforated cylindrical walls are radially spaced about a common vertical axis so as to define three coaxial spaces. A gas to be purified of suspended particles is admitted to the annular first space between the shell and a filter bed of granular material in the second space between the two perforated walls, and a purified gas is withdrawn from the third space. To clean the filter bed, granular material is conveyed from the lowermost portion of the second space through a conduit to a separating device above the topmost portion of the filter bed by a stream of conveying gas, and the gas entrains most of the particles from the granular material while the latter returns to the second space by gravity. The particle-laden conveying gas is introduced tangentially into the top portion of the annular first space where it is mixed with a scavenging gas passed through the filter bed from the third to the first space. The gas mixture with the particles suspended therein descends in a spiral path through the first space, the particles are precipitated as in a cyclone, and gas and particles are withdrawn separately from the bottom of the first space.

12 Claims, 6 Drawing Figures

METHOD AND APPARATUS FOR PURIFYING A GAS OF SUSPENDED PARTICLES

This application is a continuation-in-part of my co-pending application Serial No. 793,418, filed May 3, 1977, and now U.S. Pat. No. 4,142,873.

The invention relates to a method and apparatus for purifying a gas of suspended particles, and particularly to an upright filter bed of granular material confined between perforated walls of a purification apparatus, the filter bed being stripped of accumulated fine particles without being removed from the apparatus.

In the afore-mentioned, earlier patent, I disclosed a system in which the granular material is stripped of filtered particles by circulating it within the system by means of a conveying gas which carries off a portion of the particles, and by passing scavenging gas through the filter bed in a direction opposite to the direction in which the gas to be purified passes through the filter bed in the filtering phase of the system. The conveying and scavenging gases are released from the system while they still carry substantial amounts of particles and need to be purified.

I have now found that a much greater portion of the particles can be separated from the conveying and scavenging gases, and the filter system cleaned more efficiently during the cleaning phase of its operating cycle by leading the conveying gas to the space adjacent the filter bed to which the raw gas to be purified is supplied during the filtering phase of operation, particularly if that space is annular and the conveying gas is introduced tangentially in the manner of a cyclone.

In one of its more specific aspects, the invention provides gas purifying apparatus in which two perforated walls, annular about a common, vertically extending axis, are located in a shell, the shell and one wall define therebetween a first annular space, a second annular space is defined between the two walls, and the other wall bounds a third space. A filter bed of granular material occupies much of the second space. The bottom orifice of a vertically extending conveying conduit communicates with the lowermost portion of the second space. A gas under pressure may be fed to the bottom orifice and the communicating lowermost portion of the second space, whereby a mixture of gas and of granular material is discharged from the top orifice of the conduit if gas under sufficient pressure is supplied to the bottom orifice. A separating device separates the granular material from the gas in the mixture and communicates with the topmost portion of the second space for downward movement of the separated granular material from the separating device to the second space. A connecting conduit connects the separating device with the first space for flow of separated gas from the separating device to the first space. An inlet admits the gas to be purified to the first space, an outlet permits purified gas to be withdrawn from the third space, and a scavenging gas may be supplied to the third space.

In another aspect, the invention resides in an improvement in the method of my earlier patent in which the gas to be purified is passed from a first space to a third space through a a filter bed of granular material confined in a second space between perforated, vertically extending walls, whereby at least a portion of the particles suspended in the raw gas is retained by the granular material, and a purified gas is withdrawn from the third space in each of a plurality of filtering phases. Granular material carrying retained particles is withdrawn from the bottom portion of the second space during each of a plurality of filter bed cleaning phases alternating with the filtering phases by suspending the granular material in a stream of conveying gaseous material flowing toward a zone above the topmost portion of the second space. The suspended granular material is separated in that zone from the stream and the particles which are suspended in the stream, and the granular material is returned to the second space by gravity.

According to the present invention, the separated gaseous material and the particles suspended therein are withdrawn from the zone and introduced into the first space. The withdrawn gaseous material and the particles are separately withdrawn from the first space during each of the cleaning phases.

Other features, additional objects, and many of the attendant advantages of this invention will readily be appreciated as the same becomes better understood from the following detailed description of preferred embodiments when considered in connection with the appended drawing in which.

Figure 1:
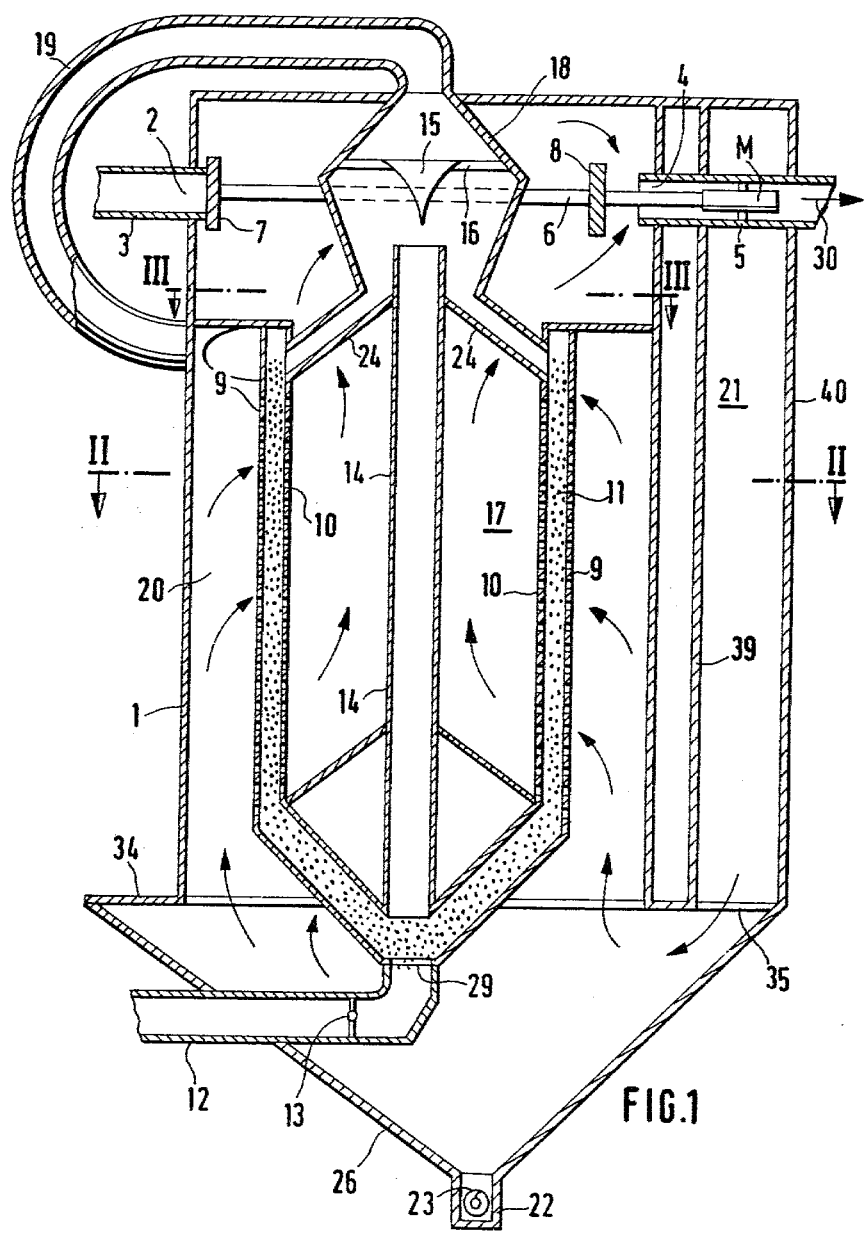
FIG. 1 shows a battery of dust filters of the invention in front-elevational section.

Referring to FIG. 1 in detail, there is seen one unit of a battery of identical dust filters. It includes an upright cylindrical shell 1 having a closed top and mounted on supporting structure which includes a hopper 26 having the approximate shape of an inverted, four-sided pyramid. The shell 1 is open toward the hopper 26, and the hopper 26 projects horizontally beyond the shell.

A radial inlet port 2 in the shell 1 near its top is connected with a supply line 3 for a scavenging gas. An outlet port 4 diametrically opposite the port 2 leads into a discharge line 5 for purified gas. A solenoid motor M is mounted in the line 5, and its armature 6 carries two valve discs 7 and 8. In the position of the armature 6 shown in FIG. 1, the valve disc 7 seals the port 2 while the port 4 is open. The portion of the armature 6 between the discs 7 is bifurcated to clear a casing 18 presently to be described, and the bifurcated armature portion is guided in brackets, not shown.

Two walls 9, 10 of circular cross section are coaxially mounted in the shell 1. Each wall has a cylindrical, perforated portion and an imperforate portion tapering conically in a downward direction. The casing 1 and the outer wall 9 define therebetween an upwardly sealed, annular space 20, and another annular space between the walls 9, 10 is filled almost to the top with a filter bed 11 of quartz sand. A screen 29 in the apex of the wall 9 separates the filter bed 11 from a gas line 12 closed by a butterfly valve 13 in the condition of the filter illustrated in FIG. 1. The apex of the wall 10 communicates with the bottom orifice of a central coaxial pipe 14. The pipe and the wall 10 radially bound a downwardly closed, upwardly open, annular space 17.

Figure 3:
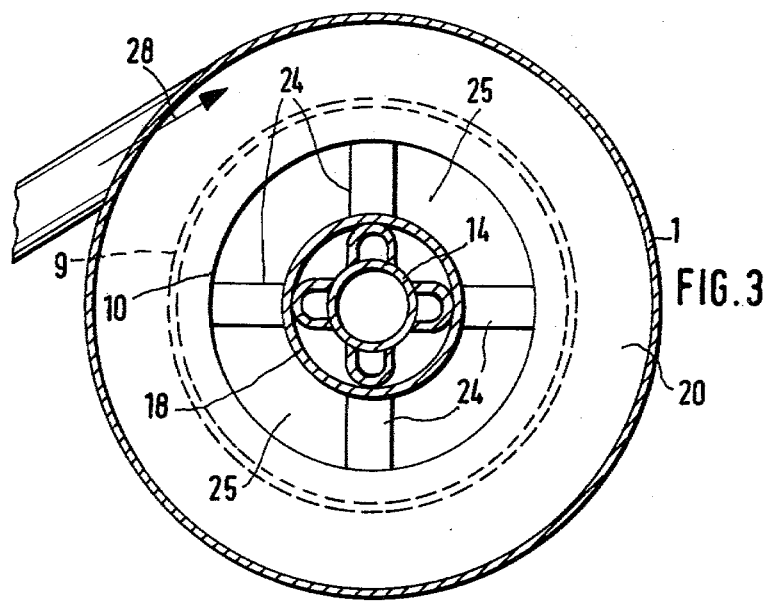
FIG. 3 shows a portion of the device of FIG. 1 in section on the line III—III.

The axial top orifice of the pipe 14 is located in a separating device whose casing 18 has the approximate shape of a double cone. An upwardly flaring baffle 15 is mounted coaxially above the orifice of the pipe 14 on a spider 16 slightly above the widest portion of the casing 18. Four pipes 24 equiangularly distributed about the vertical filter axis, as is best seen in FIG. 3, lead obliquely downward from the bottom of the casing 18 into the otherwise sealed top portion of the space between the walls 9, 10 and are separated by wide gaps 25. A conduit 19 connects the top of the casing 18 to the top portion of the space 20, the orifice of the pipe 19 being directed approximately tangentially relative to the cylindrical walls of the space 20 as indicated by an arrow 28.

Figure 2:
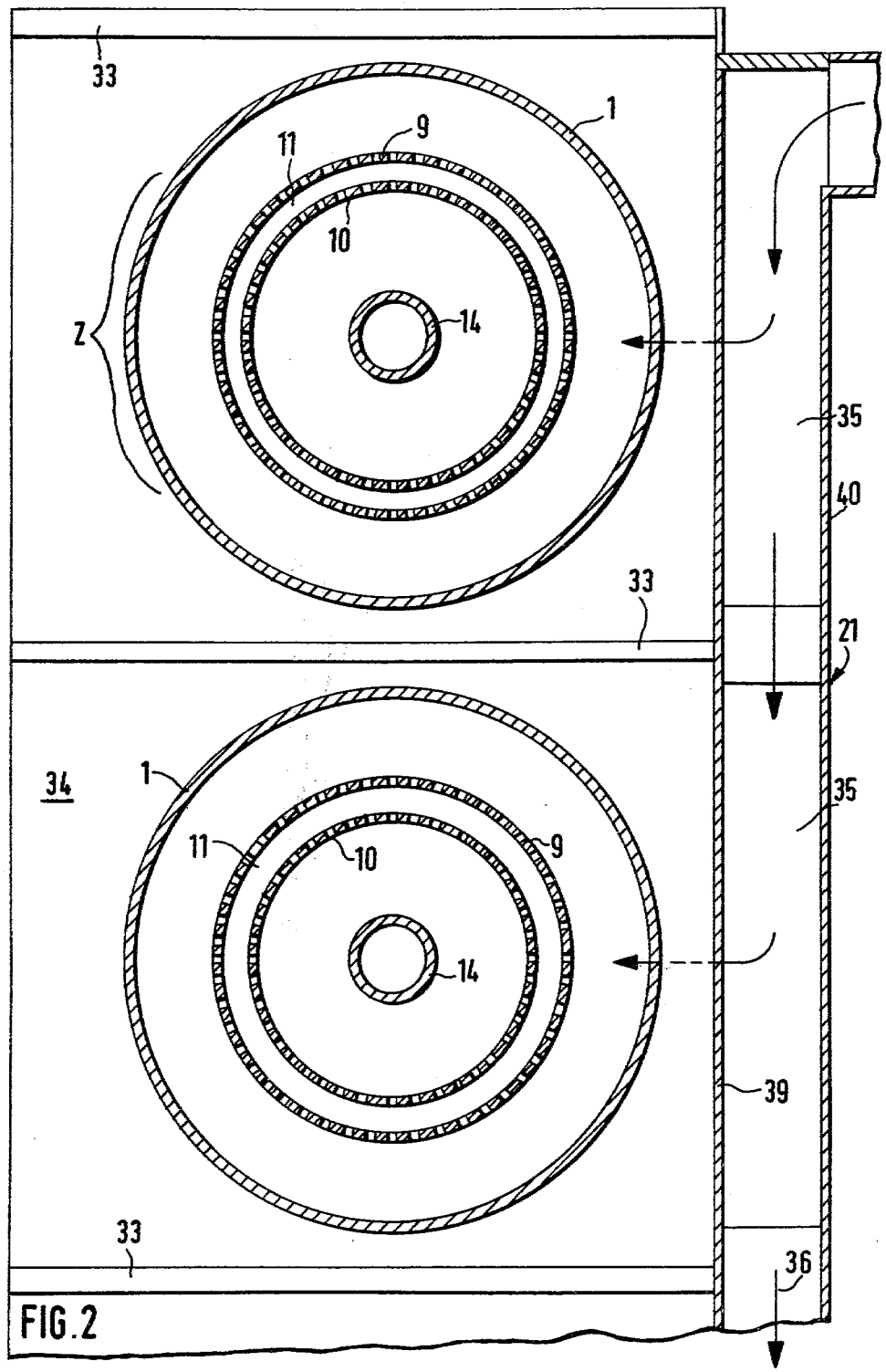
FIG. 2 illustrates the battery of FIG. 1 in fragmentary section on the line II.

As is evident from joint consideration of FIGS. 1 and 2, several, identical filter units of the type shown in FIG. 1 are juxtaposed horizontally along an upwardly closed supply duct 21 of vertically elongated cross-section whose upright walls 39, 40 rest on the top wall portions 34 of the hoppers 26 which project beyond the casings 1. Wide inlet openings 35 in the wall portions 34 connect the duct 21 with the hoppers. Contaminated gas is drawn into the duct 21 by a suction fan, not itself shown, as indicated by an arrow 36. Flanges 33 connect the top wall portions 34 of the several hoppers 26. A trough 22 connects the lowermost portions of the hoppers 26 and is provided with a screw conveyor 23.

All filter units of the battery with the exception of one or two are normally operated in the filtering mode in which the valves 7, 8, 13 are set as is shown in FIG. 1. A fan, not illustrated, draws purified gas from the port 4 as indicated by an arrow 30 with sufficient suction to draw raw or contaminated gas from the duct 21 through the opening 35 and sequentially through the hopper 26, the annular space 20, the perforations in the walls 9, 10 and the filter bed 11, the space 17, and the gaps 25 into the portion of the shell 1 above the filter bed 11 which surrounds the casing 18 and out through the port 4. Solid contaminants in the raw gas are retained partly on the outer face of the wall 9 in the annular space 20 and partly in the filter bed 11.

Figure 5:
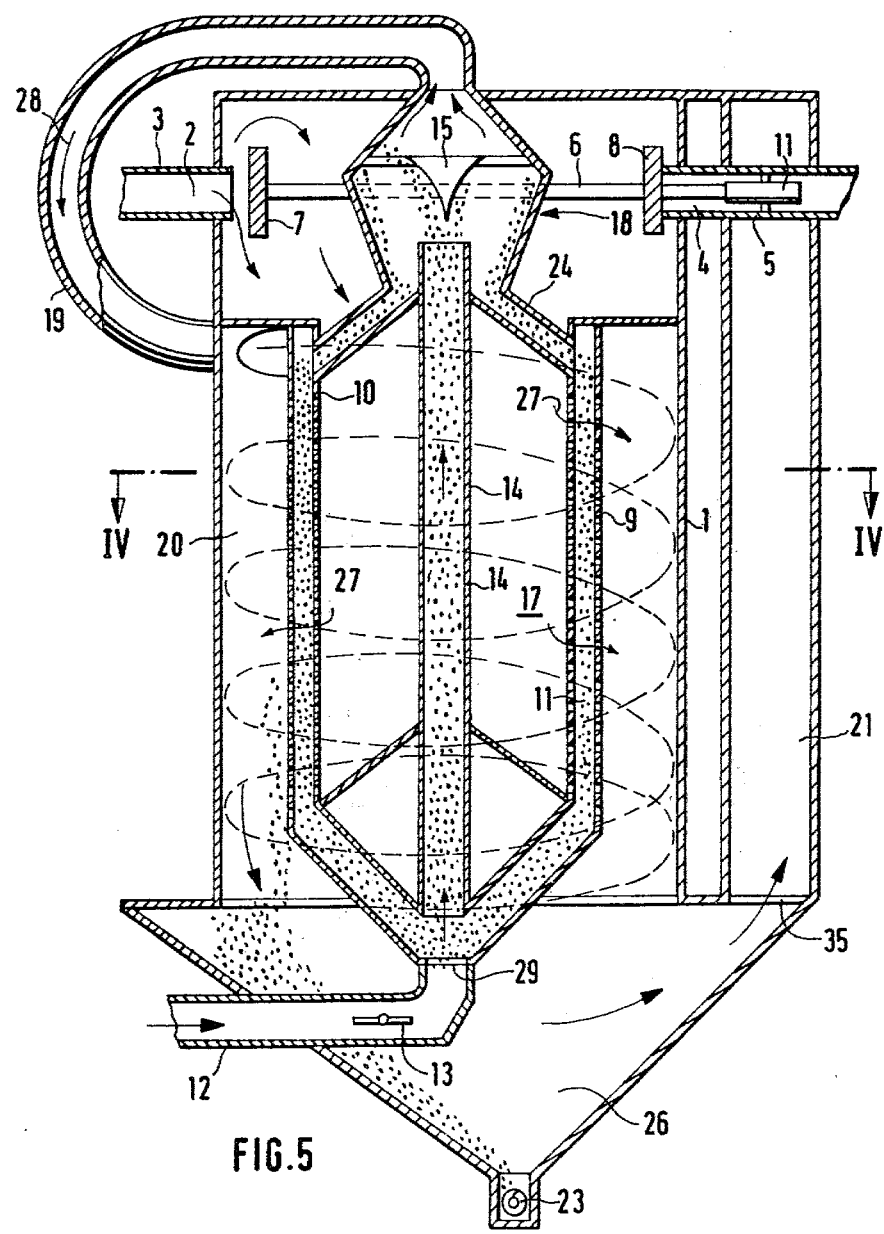
FIG. 5 illustrates the apparatus of FIG. 1 in a different operating condition.

When the filter bed 11 offers excessive resistance to gas flow due to clogging by solid particles retained from the raw gas, the solenoid motor M is energized to actuate its armature 6, whereby the valve disc 7 is lifted from the port 2, and the valve disc 8 closes the port 4. Simultaneously, the valve 13 is opened so that the unit is set for its filter cleaning phase as is shown in FIG. 5.

Figure 4:
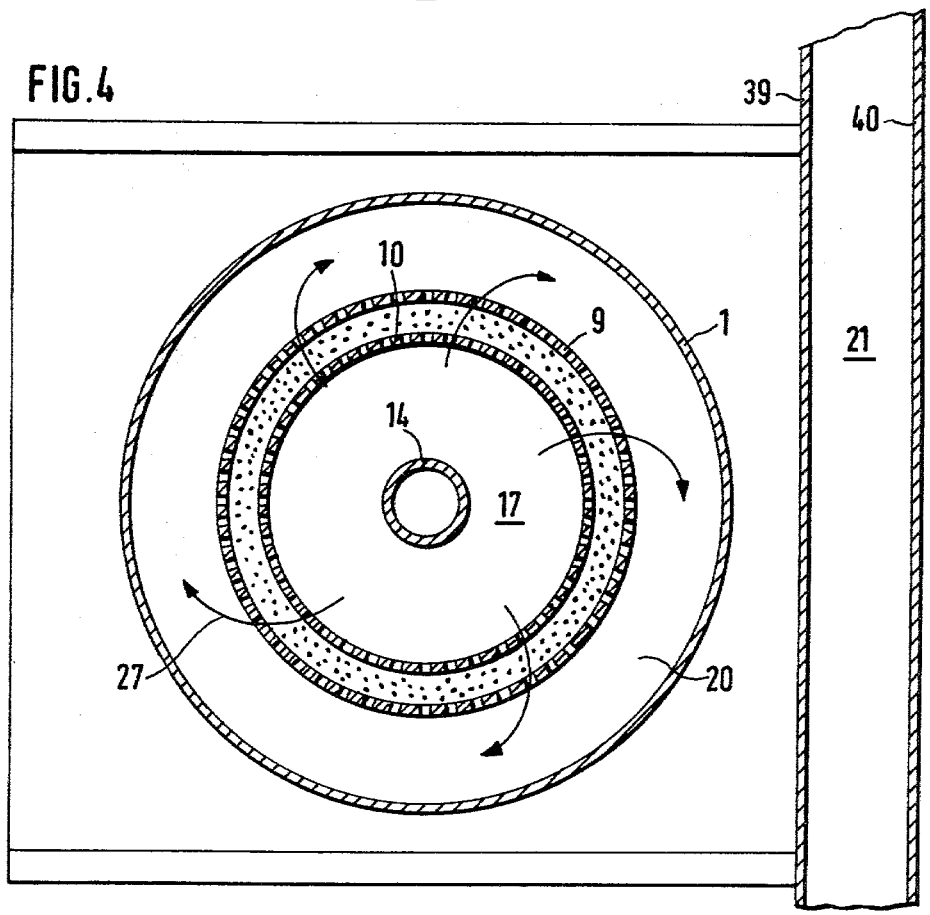
FIG. 4 shows the apparatus of FIG. 5 in section on the line IV—IV.

Scavenging gas, such as clean air or previously purified gas, is drawn into the top portion of the shell 1 from the supply line 3 by the suction fan at the end of the duct 21. The gas passes through the gaps between the pipes 24 into the space 17 and radially outward through the filter bed 11 into the annular space 20 as indicated by arrows 27 in FIGS. 4 and 5.

Simultaneously, a conveying gas, which may be identical with the scavenging gas from the line 3, is introduced under positive pressure through the line 12. It flows upward through the screen 29 into the pipe 14 at a velocity sufficient to entrain sand of the filter bed 11 lying on the screen 29 and thereby causing the filter bed as a whole to move downward between the walls 9, 10. The mixture of sand and conveying gas discharged from the top orifice of the pipe 14 is deflected toward the inner wall of the casing 18 by the arcuately curved surface of the baffle 15, and the relatively heavy and large sand grains separate from the conveying gas and move downward along the casing 18 and through the pipes 24 into the topmost portion of the annular space between the walls 9, 10 while the gas, carrying almost all dust separated from the sand, flows through the conduit 19 and enters the annular space 20 in the tangential direction indicated by the arrow 28 in FIG. 3.

Most of the dust entering the unit during the filtering phase is retained on the outer face of the wall 9 and in the portion of the filter bed 11 near the outer wall 9. The flow of scavenging gas in the reverse direction, as indicated by the arrows 27, during the cleaning phase drives at least a portion of the dust particles back into the space 20 and loosens or dislodges the dust coating the outer face of the wall 9. The dust-laden conveying gas entering the space 20 mixes with the scavenging gas, and the mixture travels downward in a helical path indicated in FIG. 5 by a broken line. While the entire mass of gas in the annular space moves about the filter axis, the velocity of gas movement is distinctly higher in the spiral path descending from the orifice of the conduit 19.

The heaviest fraction of dust particles in the space 20 moves almost straight down into the hopper 26 along the wall 9. Another fraction is centrifugally deposited on the casing 1 and moves downward along the casing. The finest particles are carried along in the fastest moving portion of the gas mixture, and largely separate from the gas mixture as the velocity of the latter decreases abruptly upon entering the hopper 26 because the flow section of the hopper is much greater than that of the space 20. The fines thus enter the hopper in the portion of the hopper circumference which is intersected by the spiral path, and whose location depends on the relationship between the fixed vertical distance of the hopper 26 from the point of entry of the conveying gas into the space 20 and the pitch of the spiral path of greatest gas velocity. The latter can be controlled under otherwise constant conditions by the valve 13 or by otherwise varying the rate of gas flow in the line 12 in such a manner that the fines mostly pass from the casing 1 to the hopper 26 along a circumferential zone Z of the casing 1, indicated in FIG. 2, which is farthest from the opening 35. Almost all dust removed from the filter bed 11 in the cleaning phase of filter operation thus eventually reaches the conveyor 23 and is discharged. The gas mixture, stripped of most dust, enters the duct 21 and is further purified in the other units of the battery which simultaneously operate in the filtering mode.

Figure 6:
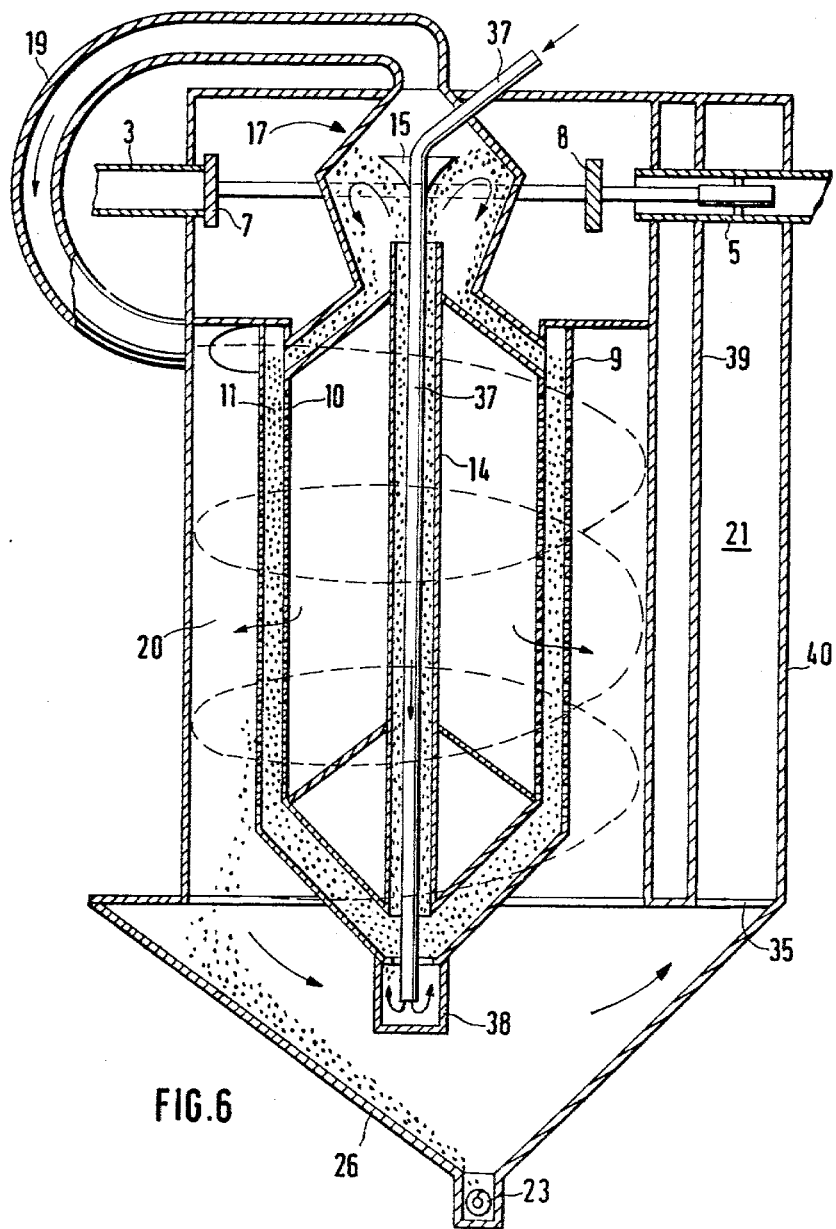
FIG. 6 shows a modification of the apparatus of FIG. 1 in a corresponding view.

The modified filter unit illustrated in FIG. 6 in its filter cleaning phase functions in the same manner as described above with reference to FIGS. 1 to 5 and differs structurally from the first-discussed embodiment only by the manner in which conveying gas is introduced into the lowermost portion of the filter bed 11. A cup-shaped receptacle 38 seals the open apex at the bottom of the wall 9. A hose 37 passes in sealing relationship through the shell 1, the casing 18, and the baffle 15. It extends from the tip of the baffle along the axis of the pipe 14 and into the receptacle 38. A valve in the portion of the hose 37 not seen in FIG. 6 controls the location in the hopper 26 in which most of the fines released from the filter bed 11 and the outer face of the wall 9 are deposited so that as little of the fine fraction as possible is carried into the duct 21.

After all the sand in the filter bed 11 was moved through the pipe 14 and the casing 18 and returned to the space between the walls 9, 10, the recycled conveying gas also has completed its centrifugal separator action in the space 20, the valves 7, 8 may be returned to the positions shown in FIG. 1 and the stream of conveying gas may be stopped. A new operating cycle starts with the next filtering phase. The condition shown in FIG. 1 is not entirely restored in that the lower portion of the pipe 14 retains some sand.

Sand is merely representative of the granular materials which may be employed as the filter bed 11, and other materials will readily be selected to suit the nature of the particles suspended in the gas to be purified. Particles other than dust may be removed from the gas, and the utility of the apparatus of the invention is not limited to solid contaminants.

It should be understood, therefore, that the foregoing disclosure relates only to presently preferred embodiments, and that it is intended to cover all changes and modifications in the examples of the invention herein chosen for the purpose of the disclosure which do not constitute departures from the spirit and scope of the invention defined in the appended claims.

What is claimed is:

1. Apparatus for purifying a gas of particles suspended therein which comprises:
   (a) a shell;
   (b) two walls in said shell
      (1) said walls being annular about a common, vertically extending axis,
      (2) said shell and one of said walls defining therebetween a first space annular about said axis,
      (3) said walls defining therebetween a second space annular about said axis,
      (4) the other one of said walls bounds a third space therein;
   (c) a filter bed of granular material in said second space,
      (1) said walls being formed with perforations permeable to the gas to be purified and to at least a portion of said particles;
   (d) a conveying conduit having a bottom orifice communicating with the lowermost portion of said second space and upwardly extending therefrom;
   (e) feeding means for feeding a gas under pressure to said bottom orifice and the communicating lowermost portion of said second space, said conduit having a top orifice, whereby a mixture of said gas under pressure and of said granular material is conveyed upwardly through said conduit and discharged from said top orifice when said gas under pressure is fed to said bottom orifice and said lowermost portion;
   (f) separating means for separating the granular material from the gas in said mixture, said separating means communicating with said top orifice in such a manner so as to receive the mixture discharged from said top orifice and with the topmost portion of said second space in such a manner so as to permit downward movement of the separated granular material from said separating means to said second space;
   (g) a connecting conduit connecting said separating means with said first space for flow of the separated gas from said separating means to said first space;
   (h) inlet means for admitting the gas to be purified to said first space,
   (i) outlet means for withdrawing purified gas from said third space; and
   (j) supply means for supplying a scavenging gas to said third space.

2. Apparatus as set forth in claim 1, wherein said shell and said one wall have respective faces bounding said first space therebetween, one of said faces being arcuate about said axis, and said connecting conduit having an orifice directed inward of said first space in a direction approximately tangential to said one face.

3. Apparatus as set forth in claim 2, wherein said faces of said shell and said one wall are substantially circular in cross section transverse to said axis, whereby said first space is circularly arcuate in cross section, said direction being approximately tangential to said first space.

4. Apparatus as set forth in claim 1, wherein said separating means includes a casing and baffle means in said casing for deflecting the mixture discharged from said top orifice against said casing.

5. Apparatus as set forth in claim 4, wherein said baffle means includes a baffle member having a tip opposite said top orifice and flaring from said tip in an upward direction away from said top orifice.

6. Apparatus as set forth in claim 4, wherein said conveying conduit extends from said lowermost portion through said third space to said separating means, the separating means further including a plurality of pipes angularly distributed about said conveying conduit and connecting said casing to said topmost portion.

7. Apparatus as set forth in claim 1, wherein said feeding means includes a feeding conduit passing through said conveying conduit between the orifices thereof.

8. Apparatus as set forth in claim 1, further comprising means for withdrawing solid particles from the lowermost portion of said first space.

9. In a method of purifying a gas of suspended particles in which the gas to be purified is passed from a first space to a third space through a filter bed of granular material confined in a second space between perforated, vertically extending walls, whereby at least a portion of said particles is retained by said granular material, said second space having topmost and lowermost portions, and purified gas is withdrawn from said third space in each of a plurality of filtering phases, granular material carrying retained particles is withdrawn from said lowermost portion during each of a plurality of filter bed cleaning phases alternating with said filtering phases by suspending the granular material in a stream of conveying gaseous material flowing toward a zone above said topmost portion, the suspended granular material is separated in said zone from said stream and said particles, the particles being suspended in said stream, the granular material being returned to said second space by gravity, the improvement which comprises:
   (a) withdrawing the separated gaseous material and the particles suspended therein from said zone,
   (b) introducing the withdrawn material and the particles into said first space, and
   (c) separately withdrawing said gaseous material and the particles from said first space during each of said cleaning phases.

10. In a method as set forth in claim 9, scavenging gas being passed through said filter bed from said third space to said first space during each of said cleaning phases and being mixed with said withdrawn gaseous material in said first space.

11. In a method as set forth in claim 10, said first space being annular about a vertically extending axis, and said withdrawn material and particles being introduced into said first space in a substantially tangential direction.

12. In a method as set forth in claim 11, said gaseous material and particles being introduced into the topmost portion of said first space so as to move downward in said first space in a path spiraling about said axis.

* * * * *